United States Patent [19]

Teramoto

[11] 4,429,775
[45] Feb. 7, 1984

[54] CLUTCH TYPE TORQUE CONTROL DEVICE FOR AIR DRIVER

[75] Inventor: Hirokazu Teramoto, Nara, Japan
[73] Assignee: Uryu Seisaku, Ltd., Osaka, Japan
[21] Appl. No.: 240,615
[22] Filed: Mar. 5, 1981
[30] Foreign Application Priority Data
    Mar. 5, 1980 [JP] Japan .................. 55-28264
[51] Int. Cl.³ .................. B60K 41/02; F16D 7/02
[52] U.S. Cl. .................. 192/0.096; 192/56 R; 192/93 A; 192/150; 173/12
[58] Field of Search .................. 192/0.034, 56 F, 150, 192/93 A, 56 R, 0.096; 173/12

[56] References Cited

U.S. PATENT DOCUMENTS

| | | | |
|---|---|---|---|
| 3,993,145 | 11/1976 | Findeli | 173/12 |
| 4,006,785 | 2/1977 | Roll et al. | 192/150 X |
| 4,049,104 | 9/1977 | Webb | 192/150 |
| 4,071,092 | 1/1978 | Wallace | 192/150 X |
| 4,154,308 | 5/1979 | Goldsberry | 173/12 |

Primary Examiner—George H. Krizmanich
Attorney, Agent, or Firm—Wenderoth, Lind & Ponack

[57] ABSTRACT

A clutch type torque control device characterized in that balls seated in ball receiving holes made in a main shaft are pressed against squarely planed-off surfaces made at the outer circumferential surface of a cam fitted to a driving shaft which is driven by an air driven motor through the medium of a spring and a cam ring for transmission of motive power from the cam to the main shaft and a stop pin inserted in the main shaft is engaged with a planed-off part made at the outer circumferential surface of a pilot pin slidably inserted in the cam, whereby when a torque load on the main shaft reaches a predetermined torque value the stop pin is disengaged from said planed-off part due to rotational difference between the cam and the main shaft and consequently a valve kept open through the medium of the pilot pin and a push rod is closed, resulting in the stopping of the motor.

6 Claims, 13 Drawing Figures

CLUTCH TYPE TORQUE CONTROL DEVICE FOR AIR DRIVER

BACKGROUND OF THE INVENTION

This invention relates to a torque control device to stop a pneumatic tool for driving, a screw for example, an air driver, a nut runner or the like, when the torque load reaches an adjustably predetermined magnitude.

The main object of the present invention is to provide a torque control device which is simple in construction, compact in size, accurate in action and whose torque is easy to adjust.

BRIEF DESCRIPTION OF THE DRAWINGS

The nature and advantage of the present invention will be understood more clearly from the following description with reference to the accompanying drawings, in which.

DETAILED DESCRIPTION OF THE PREFERRED EMBODIMENT

Figure 1:
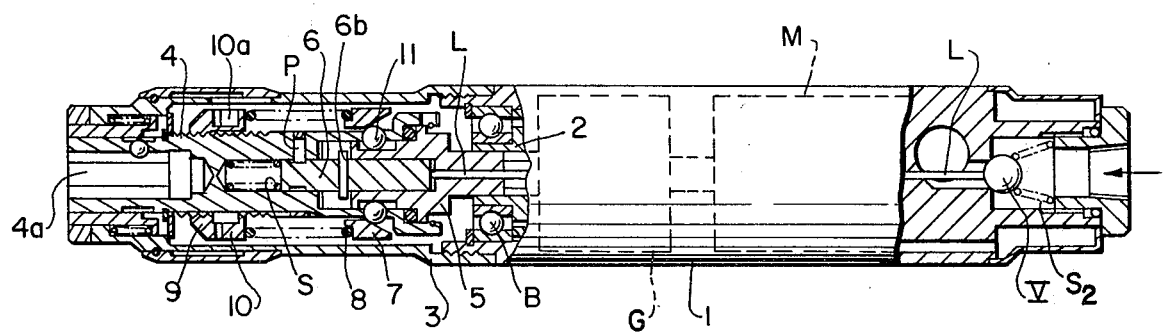
FIG. 1 is a front view of a torque control device for an air driver according to the present invention, with the main part thereof broken away.

In the drawings, numeral 1 denotes a main body of a pneumatic tool for driving a screw, such as an air driver, a nut runner, etc. (hereinafter referred to as "air driver"). High-pressure air is supplied into the main body 1 by opening and closing action of a conventional valve V so as to work an air motor M housed in the main body 1. A driving shaft 2 of a reduction gear part G (schematically shown in the drawing) which is driven by the air motor M is supported rotatably by the main body 1 through the medium of bearings B. An engaging hole 2a is formed at the top end of the driving shaft 2. A cylindrical casing 3 is screwed to the top end of the main body 1. Fitted in cylindrical casing 3 are a main shaft 4, a cam 5, a pilot pin 6, a cam ring 7, springs 8, adjust screws 9, balls 11, and so on, which constitute a torque control device.

Figure 2A:
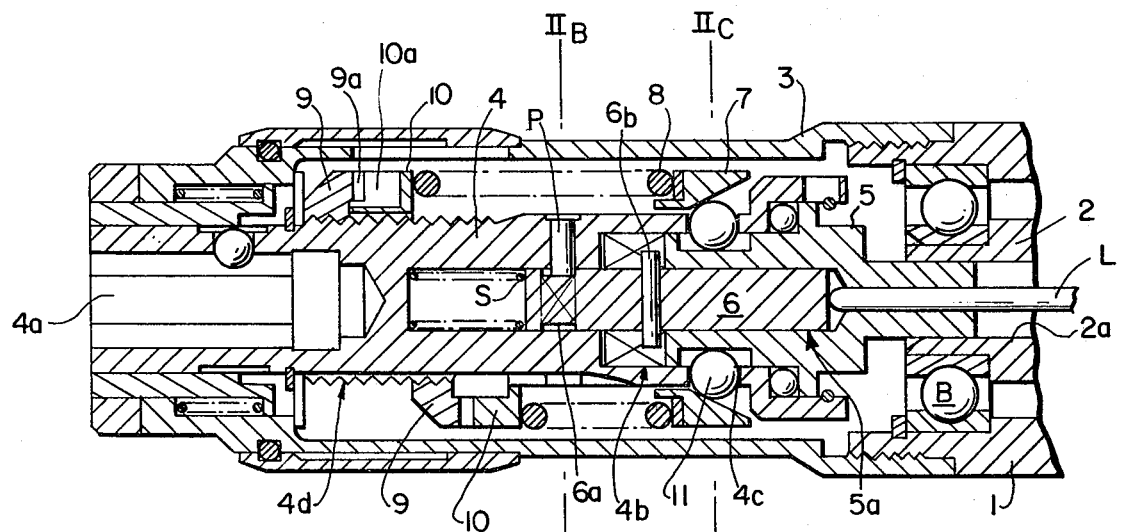
FIG. 2A is a sectional view of a torque adjusting part, showing the state of a pneumatic tool before it works.
Figure 2B:
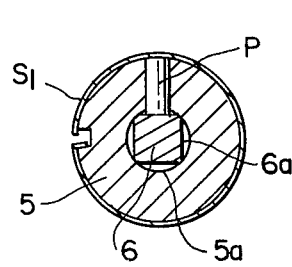
FIG. 2B and FIG. 2C are cross-sectional views of the torque adjusting part shown in FIG. 2A, taken along the line IIB—IIB and the line IIC—IIC, respectively.
Figure 2C:
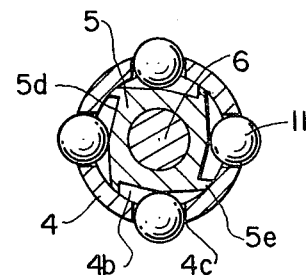
Figure 2D:
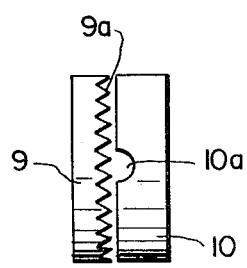
FIG. 2D is a plan view of the detent and the adjust screw.
Figure 4B:
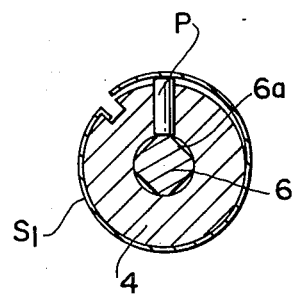
FIG. 4B and FIG. 4C are cross-sectional views of the torque adjusting part shown in FIG. 4A, taken along the line IVB—IVB and the line IVC—IVC, respectively.
Figure 4C:
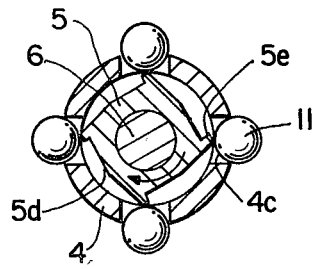
Figure 5:
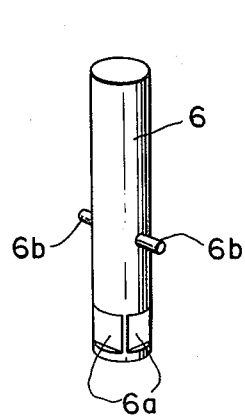
FIG. 5 is a schematic view of a pilot pin part.
Figure 6:
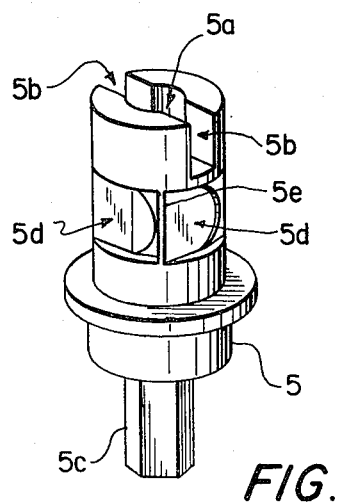
FIG. 6 is a schematic view of a cam part.

The main shaft 4 has at the top part thereof a hole 4a in which various attachments are supported detachably. This main shaft 4 is inserted in and supported by the cylindrical casing 3. At the other end of the main shaft 4, there is provided a cavity 4b in which the pilot pin 6 and the cam 5 are fitted. Threads 4d are made at the outer circumference of the middle part of the main shaft 4. The pilot pin 6 is fitted in the cavity 4b through the medium of a spring S. This pilot pin 6 has planed-off portions 6a at the circumference of its top end, as shown by FIG. 5. A pin 6b is passed through and fixed in the central part of the pilot pin 6. The top end of the pilot pin 6 is forced to make contact with the spring S and the other end is inserted in a pilot pin receiving hole 5a made at the top end of the cam 5. Before the air driver is driven, namely, while the air motor is stopped, the planed-off part 6a of the pilot pin 6 engages with a stop pin P which is inserted in the main shaft 4 slidably and in such a fashion that it is always urged to advance toward the center of the main shaft 4 by means of a ring spring S₁ (refer to FIG. 4B). The pin 6b of the pilot pin 6 is inserted in a cut groove 5b which is in parallel with the longitudinal direction of the cam shaft. A shown in FIG. 3A, the cam 5 carries at the other end thereof an engaging part 5c of polygonal pillar shape which is fitted in and supported by a polygonal hole 2a of the driving shaft 2 slidably in the axial direction but immovably in the circumferential direction. A valve push rod L is passed through the engaging part 5c. This rod L opposes or contacts valve V at one end as shown in FIG. 1 and opposes or contacts the rear end face of the pilot pin 6 at the other end as shown in FIG. 2A. As shown in FIG. 2C, the cam 5 is planed off at its outer circumference so that it presents a substantially square cross section and the planed-off surfaces serve as ball support surfaces 5d. As shown in FIG. 2C, FIG. 3C and FIG. 4C, these ball support surfaces 5d are so designed that they act as a clutch in their clockwise rotation but are inoperative in their counter clockwise rotation. One steel ball 11 engages with and is supported by each ball support surface 5d. As shown in FIG. 2A, the ball 11 seated in and supported by a ball receiving hole 4c made in the main shaft 4 is adapted to make contact with each ball support surface 5d of the cam 5. A cam ring 7 with its surface contacting the ball tapered is fitted to the outer circumference of the ball support part of the main shaft 4. An adjust screw 9 is threadedly connected to the outer circumference of the main shaft 4. As shown by FIG. 2D, teeth 9a are made in gear shape at the side where a detent 10 and the adjust screw 9 are opposed. The top end of a plus driver is fitted in a cavity 10a of the detent 10 provided at the outer circumference of the main shaft 4. When the plus driver is rotated in such a fashion that it tightens a screw, the plus (cross) part of the driver and the teeth 9a of the adjust screw 9 engage with each other as if they were gears, whereby the adjust screw 9 rotates normally or reversely. A spring 8 for torque adjusting is interposed between the cam ring 7 and the detent 10 so that the cam ring 7 and the detect 10 are urged apart from each other. Thus, the tapered surface of the cam ring 7 is pressed against the balls 11 by the pressing force of the spring 8 and when the torque transmitted to the main shaft 4 from the cam 5 via the balls 11 exceeds a predetermined value, the balls are pushed out in the outer circumferential direction by the ball support surfaces 5d of the cam 5, whereby transmission of torque between the cam 5 and the main shaft 4 is stopped.

Figure 3A:
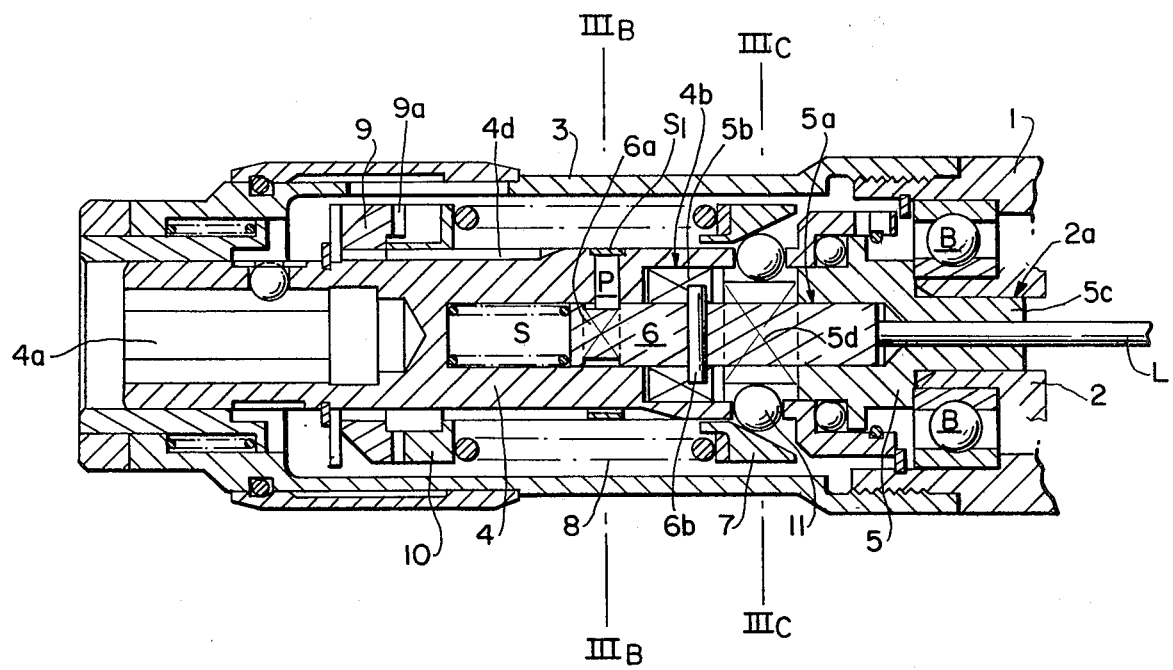
FIG. 3A is a sectional view of the torque adjusting part, showing the state of a pneumatic tool in operation.
Figure 3B:
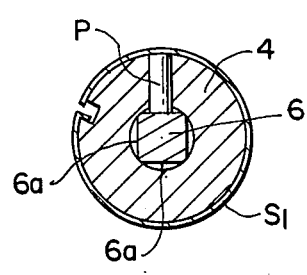
FIG. 3B and FIG. 3C are cross-sectional views of the adjusting part shown in FIG. 3A, taken along the line IIIB—IIIB and the line IIIC—IIIC, respectively.
Figure 3C:
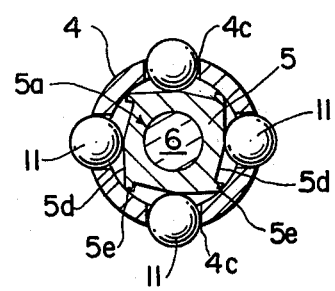

In the air driver constructed as described above, when tightening a bolt, a nut, a screw or the like by fitting an attachment (not shown in the drawings) in engaging hole 4a at the top end of main shaft 4, if the main body of the air driver is pressed in an axial direction toward articles to be tightened so that the attachment may contact them, the main shaft 4 retreats axially, from the position shown in FIG. 2A to the position shown in FIG. 3A. At this time, pilot pin 6 and cam 5 which are axially movable with main shaft 4 and are slidable in case 3 also retreat together with main shaft 4. Valve push rod L fitted in cam 5 is thus pushed rearward so as to force valve V to open against spring S₂, whereby high pressure air is supplied to air motor M, causing it to run. Since the cam 5 is fitted in the driving shaft 2, the cam 5 turns in concert with the driving shaft 2 and the balls 11 supported by the main shaft 4 by the pressing force of the spring 8 are pressed against the ball support surfaces 5d of the cam 5. Thus, motive power is transmitted to the main shaft 4 from the cam 5 via the ball 11 and the desired tightening is effected. At this time, the stop pin P supported by the main shaft 4 hits against the planed-off part 6a of the pilot pin 6 and engages with it. The pilot pin 6 is urged to be pressed against the cam side by the action of the spring S and the pin 6b is pressed in the cut groove 5b of the cam 5. Accordingly, the cam 5, the main shaft 4 and the pilot pin 6 turn in concert. At this time, as the pilot pin 6 pushes the valve push rod L by its rear end face and thereby open the valve V provided at the air passage communicating with a main valve, high-pressure air is supplied to the air motor.

Figure 4A:
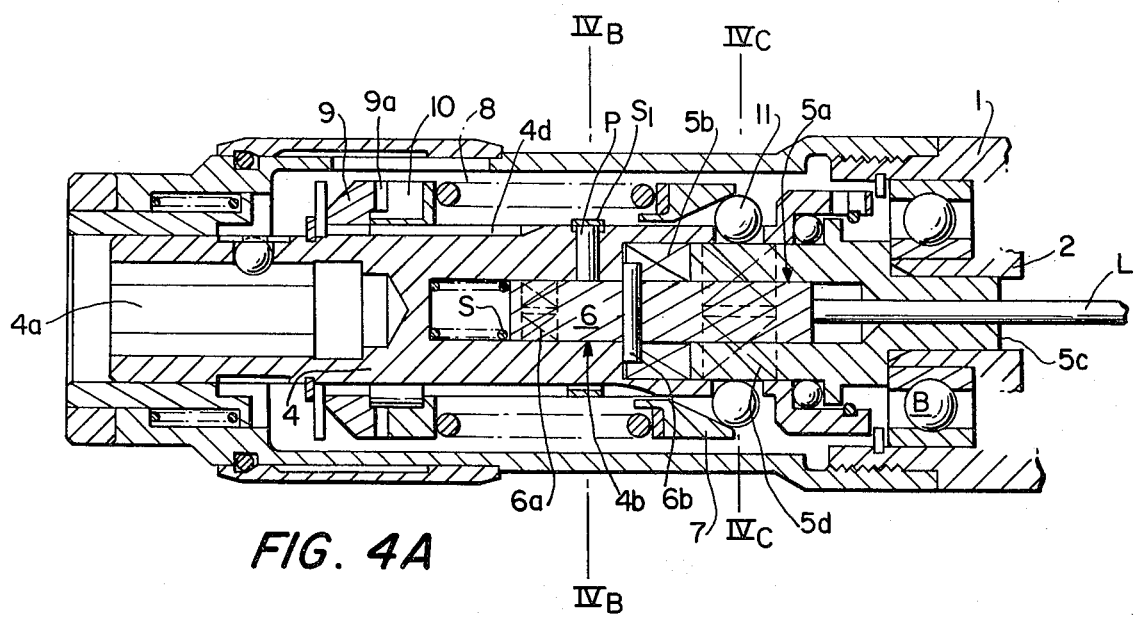
FIG. 4A is a sectional view of the torque adjusting part, showing the state of a pneumatic tool upon completion of operation.

When a tightening torque reaches the value predetermined by adjustment of the pressing force of the spring 8, the rotating torque of the cam 5 becomes larger than the pressing force of the spring 8 by which the balls 11 are pressed against the ball support surfaces 5d of the cam 5 through the medium of the cam ring 7. When the rotating torque of the cam 5 becomes larger than the pressing force of the spring 8, the balls 11 which are pressed against the ball support surfaces 5d are pushed upward, namely, the ball is lifted along the tapered surface of the cam ring (namely, is forced to spring out in the outer circumferential direction of the main shaft 4) and compresses the spring 8. When the balls are lifted from the ball supporting surfaces 5d of the cam 5 toward the outer cicumference (refer to FIG. 4C) sliding occurs between the cam and the main shaft 4 through the medium of the balls and accordingly there is caused the rotational difference between the two which, in its turn, causes the rotational difference between the main shaft 4 and the pilot pin 6 which is rotating in concert with the cam 5 and the pin P is pushed up by the planed-off part 6a of the pilot pin 6 (refer to FIG. 4B), whereupon the planed-off part 6a of the pilot pin 6 is disengaged from the main shaft 4, and a part of the high-pressure air supplied to the main body 1 and the pressing force of the valve V actuated by the spring S₂ press the pilot pin 6 through the rod L against the force of the spring S and shuts off the valve V. Thus, supply of high-pressure air is suspended and the air motor is stopped (refer to FIG. 4A). As soon as the predetermined torque is reached in the above manner, the air driver is stopped. After tightening is complete, when the tool is released from pressing a tightening screw, a nut or a ball, the main shaft 4 returns from the state where it is put in the casing slightly to its original state as shown in FIG. 2A, whereupon the pilot pin 6 returns to its original state by the action of the spring S, the pin P engages with the planed-off part 6a of the pilot pin 6, ready for the succeeding tightening work.

According to the present invention, the air driver is stopped by such mechanism that a pin fitted in and supported by a main shaft is engaged with the planed-off part made at the outer circumference of a pilot pin fitted slidably in a cam and when a load on the main shaft reaches a predetermined torque, the pin is released from engagement with the planed-off part due to the rotational difference between the cam and the main shaft and at the same time a valve which has been compressed and opened through the medium of the pilot pin and a push rod is closed, whereupon the air driver is stopped. Thus, the air driver according to the present invention has such advantages that it is simple in construction, light in weight, compact in size and easy in torque adjusting.

What I claim is:

1. A clutch type torque control device, comprising:
   a longitudinally extending housing having a front end and a rear end, having a central, longitudinally extending, first cavity open at said front and rear ends, and having a central longitudinally extending axis along said first cavity;
   a main shaft having a work end at said front end and extending in said first cavity toward said rear end, said main shaft being rotatable about said central axis and having a longitudinally extending second cavity opening at its rearmost end and a radially extending passage opening into said second cavity, said main shaft having a rear portion having a plurality of ball receiving holes circumferentially spaced about said central axis rearward of said passage;
   a drive shaft rotatable about said central axis extending longitudinally rearward of said main shaft;
   a plurality of balls movably fitted in said plurality of ball receiving holes;
   a cam located between said main shaft and said drive shaft, rotatable with said drive shaft about said central axis, having cam surfaces including substantially flat cam surfaces for engaging said plurality of balls so as to rotate said plurality of balls and said main shaft therewith about said central axis, and having intermediate cam surfaces between said substantially flat cam surfaces closer to said plurality holes than said substantially flat cam surfaces;
   means, including a first spring, for pushing said plurality of balls through said plurality of ball receiving holes against said cam surfaces, whereby a predetermined torque on said cam through said drive shaft pushes said plurality of balls aginst the force of said first spring from said flat cam surfaces onto said intermediate cam surfaces releasing the torque from said main shaft, whereby said cam rotates independently of said main shaft;
   a pilot pin mounted to said cam for rotation about said central axis therewith and for movement with respect thereto in opposite first and second longitudinal directions extending into said second cavity and having an outer planed-off surface longitudinally forward of said cam;
   a stop pin slidably mounted in said passage having a first end abutting said pilot pin and a second end, said first end being fittable onto said planed-off surface;
   a second spring engaging said stop pin at said second end and said pilot pin, for pressing said stop pin radially inward into abutting contact with said pilot pin, said stop pin engaging said planed-off surface during rotation of main shaft with said cam so as to block movement of said pilot pin in said second direction, rotation of said pilot pin with said cam relative to said main shaft pushing said stop pin radially outward and off said planed-off surface;

an air driven motor in said housing engaging said drive shaft for rotating said drive shaft about said central axis;

means, responsive to longitudinal movement of said pilot pin in said opposite first and second longitudinal directions, for respectively providing and closing off access of pressurized air through said first cavity to said motor for driving said motor; and means for urging said pilot pin in said second directions so as to push said pilot pin in said second direction when said stop pin is off said planed-off surface.

2. A device as in claim 1, wherein said cam extends into said second cavity, said flat cam surfaces and said intermediate cam surfaces facing generally radially of said cam away from said central axis and said plurality of balls surrounding said cam surfaces.

3. A device as in claim 2, wherein said urging means further comprises a cam ring having an oblique surface contacting said plurality of balls, said first spring engaging said cam ring for urging said cam ring longitudinally rearward, so that said oblique surface imparts a longitudinally rearward and axially inward force on said plurality of balls.

4. A device as in claim 1, wherein the longitudinal width of said planed-off surface is larger than the longitudinal width of said stop pin so that limited longitudinally movement of said pilot pin is possible while retaining said first end of said stop pin on said planed-off surface.

5. A device as in claim 1, wherein said motor is located longitudinally rearward of said stop pin, said urging means including a valve member located at said rear end of said housing, a push rod longitudinally extending through said cam into abutting contact with said pilot pin at one end thereof and engaging said valve, a third spring mounted in said second cavity urging said pilot pin longitudinally rearward, and a fourth spring engaging said valve member at said rear end of said housing for urging said valve member longitudinally forward, whereby said fourth spring pushes said valve member, said push rod and said pilot pin rearward against the force of said third spring so that said valve member closes off access of said pressurized air to said motor when said stop pin is off said planed-off surface.

6. A device as in claim 1, wherein said second spring is a ring spring surrounding said main shaft.

* * * * *